US010160596B2

(12) United States Patent
Lawson (10) Patent No.: US 10,160,596 B2
(45) Date of Patent: Dec. 25, 2018

(54) REFUSE CONTAINER SUPPORT APPARATUS (71) Applicant: Greg Lawson, Hixson, TN (US)

(72) Inventor: Greg Lawson, Hixson, TN (US)

(*) Notice: Subject to any disclaimer, the term of this patent is extended or adjusted under 35 U.S.C. 154(b) by 508 days.

(21) Appl. No.: 14/305,706

(22) Filed: Jun. 16, 2014

(65) Prior Publication Data

US 2014/0293593 A1 Oct. 2, 2014

Related U.S. Application Data (63) Continuation-in-part of application No. 13/361,608, filed on Jan. 30, 2012.

(51) Int. Cl.
| *B65F 1/08* | (2006.01) |
| *B65F 1/14* | (2006.01) |
| *F21V 33/00* | (2006.01) |
| *F21S 9/03* | (2006.01) |
| *G09F 7/18* | (2006.01) |
| *E01F 9/623* | (2016.01) |
| *F21S 8/08* | (2006.01) |

(52) U.S. Cl.
CPC .......... *B65F 1/141* (2013.01); *B65F 1/1426* (2013.01); *E01F 9/623* (2016.02); *F21S 9/03* (2013.01); *F21V 33/0004* (2013.01); *G09F 7/18* (2013.01); *B65F 2210/172* (2013.01); *F21S 8/08* (2013.01); *G09F 2007/1804* (2013.01); *Y02W 30/10* (2015.05)

(58) Field of Classification Search
CPC ........ B65F 1/08; B65F 1/0066; B65F 1/1426; B65F 1/141; B65F 1/14; B65F 1/1415; B65F 1/1421

USPC ........................................ 40/606.05; 220/475
See application file for complete search history.

(56) References Cited

U.S. PATENT DOCUMENTS

| 1,380,252 | A | * | 5/1921 | Richardson | .................. 232/43.2 |
| 1,937,411 | A | | 12/1931 | Cutter | |
| 2,157,199 | A | * | 5/1939 | Doering | ......................... 40/473 |
| 2,448,456 | A | | 8/1948 | Niskanen et al. | |
| 2,490,790 | A | * | 12/1949 | Emerson | ................... 220/23.87 |
| 2,552,745 | A | | 5/1951 | Stanley et al. | |
| 2,644,460 | A | | 7/1953 | Miller | |
| 2,701,700 | A | | 2/1955 | Williamson | |

(Continued)

*Primary Examiner* — Cassandra Davis
(74) *Attorney, Agent, or Firm* — Pitts & Lake, P.C.

(57) ABSTRACT

Disclosed is a refuse container support apparatus including an elongated post member including a first end and a second end, with the first end disposed to support the second end above the ground, at least one foot member coupled to the post member between the first and second ends to at least partially support a refuse container above the ground, and at least one attachment bar to removably couple a refuse container to the post member from within the interior of a refuse container. The present general inventive concept can also include a substantially flat base member coupled to the post member's first end, a light in electrical communication with a solar panel disposed atop the post member, and a surround member coupled to the post member to receive and support a refuse container. The present general inventive concept can also include a fixed cover permanently attached to the surround member and a hinged gate member attached to the surround member to allow the refuse container to slide into and out of the surround member.

28 Claims, 10 Drawing Sheets

(56) References Cited

U.S. PATENT DOCUMENTS

| | | | |
|---|---|---|---|
| 2,791,347 A | 5/1957 | Boehm | |
| 2,865,590 A | 12/1958 | Greenwell | |
| 2,929,512 A | 3/1960 | McDougle | |
| 3,224,717 A * | 12/1965 | Mott | B65F 1/141 211/83 |
| 3,255,986 A * | 6/1966 | Eadie | B65F 1/141 248/147 |
| 3,504,846 A * | 4/1970 | Barnhill | 232/43.2 |
| 3,908,853 A * | 9/1975 | Keesling | 220/475 |
| 4,072,286 A | 2/1978 | Foncannon | |
| 4,319,310 A * | 3/1982 | Kingsley | B61L 5/1881 136/291 |
| 4,468,878 A | 9/1984 | Maher | |
| 4,559,747 A | 12/1985 | Engel | |
| 4,860,909 A * | 8/1989 | Leumi | B65F 1/12 211/81 |
| D304,632 S * | 11/1989 | Skalka | D34/6 |
| 4,878,642 A | 11/1989 | Kirby, Jr. | |
| 4,940,201 A | 7/1990 | Kurth | |
| 5,067,626 A * | 11/1991 | Leumi | B65F 1/12 220/475 |
| 5,139,299 A * | 8/1992 | Smith | B65F 1/0066 220/23.4 |
| 5,149,031 A * | 9/1992 | Henri | B65F 1/141 248/131 |
| 5,149,188 A * | 9/1992 | Robbins | F21S 8/086 136/291 |
| 5,213,294 A | 5/1993 | DeBord | |
| 5,259,612 A | 11/1993 | Matherne et al. | |
| 5,415,393 A | 5/1995 | Fitzsimmons et al. | |
| 5,463,973 A | 11/1995 | Tait | |
| 5,690,259 A | 11/1997 | Montani | |
| 5,882,932 A | 1/1999 | Walsh et al. | |
| 5,887,834 A | 3/1999 | Gellos et al. | |
| 5,984,587 A * | 11/1999 | Odle | 405/244 |
| 6,311,859 B1 * | 11/2001 | Haas | 220/4.22 |
| D452,301 S | 12/2001 | Schwartz et al. | |
| 6,405,989 B2 | 6/2002 | Davis et al. | |
| 6,530,675 B1 | 3/2003 | Van Etten | |
| 6,612,457 B1 * | 9/2003 | Caron | 220/480 |
| 6,786,349 B2 | 7/2004 | Najd | |
| 7,241,023 B1 | 7/2007 | Carpenter | |
| 7,322,549 B2 | 1/2008 | Luna-Keaton | |
| 7,494,098 B1 | 2/2009 | Fulda | |
| 7,628,289 B1 * | 12/2009 | Boyd | B65F 1/141 220/484 |
| 8,631,998 B1 * | 1/2014 | Connelly | A47G 29/1216 232/39 |
| 2009/0040750 A1 * | 2/2009 | Myer | F21S 8/083 362/183 |
| 2010/0027274 A1 | 2/2010 | Liu et al. | |

\* cited by examiner

REFUSE CONTAINER SUPPORT APPARATUS

CROSS-REFERENCE TO RELATED APPLICATIONS

This application is a continuation-in-part of U.S. patent application Ser. No. 13/361,608, filed on Jan. 30, 2012, the contents of which are incorporated by reference herein in its entirety.

STATEMENT REGARDING FEDERALLY-SPONSORED RESEARCH OR DEVELOPMENT

Not Applicable

BACKGROUND OF THE INVENTIVE CONCEPT

1. Field of Invention

The present general inventive concept relates to the temporary storage of refuse prior to collection for permanent disposal. More particularly, the present general inventive concept relates to a refuse container support apparatus capable of accommodating features in accordance with various embodiments disclosed herein.

2. Description of the Related Art

Refuse container holders of various kinds are known in the art. For instance, U.S. Pat. No. 2,929,512 discloses a garbage can rack to support a garbage can by a handle disposed within an upwardly opening yoke on the top of a post. Prior art racks that support an elevated garbage can primarily depend on the garbage can's side handles for support. Thus, garbage cans without side handles are not accommodated by those prior art racks. What is needed is a refuse container support apparatus that supports an elevated refuse container in a vertical position without relying on any side handles of the refuse container.

Further, prior art refuse container holders are limited in that they only support a refuse container. In today's modern age, there exists a need for a refuse container that is also capable of other applications. For instance, what is desired is a refuse container support apparatus that can also display an elevated sign, viewable from a substantial distance away from the support apparatus. Moreover, what is desired is a refuse container support apparatus capable of using solar power to illuminate an area immediately adjacent to the support apparatus.

BRIEF SUMMARY OF THE INVENTIVE CONCEPT

The present general inventive concept provides a refuse container support apparatus that supports an elevated refuse container in a substantially vertical position without relying on any side handles of the refuse container.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by an elongated post member including a first end and a second end, with the first end disposed to support the second end above the ground. One or more foot members are coupled to the post member between the first and second ends to at least partially support a refuse container above the ground, and one or more attachment bars are provided to removably couple a refuse container to the post member from within the interior of the refuse container.

The first end of the post member can be inserted into the ground to support the post member in a substantially vertical manner, with one or more foot members disposed at a selected distance from the first end such that the one or more foot members remain elevated above the ground when the first end is disposed in the ground. Alternatively, the present general inventive concept can also be achieved by including a substantially flat base member coupled to the post member's first end such that the base member supports the post member in a substantially vertical manner. One or more wheels can be coupled to a perimeter edge of the base member. The base member and apparatus can have dimensions such that at least six hundred pounds of force applied to the post member at a height of six feet is required to overturn the apparatus.

One or more fasteners can be included to penetrate a refuse container and removably couple the one or more attachment bars and a refuse container to the post member.

One or more static bars can be coupled to the post member between the one or more foot members and the post member's second end. The one or more attachment bars can be removably coupled to the one or more static bars by the one or more fasteners. One or more spacers can couple the one or more static bars to the post member.

One or more sign retaining members can be coupled to the post member to receive and display a sign. A substantially flat top member can be coupled to the second end of the post member such that the top member is substantially parallel to the ground. A solar panel can be coupled to the top member and a light can be coupled to the post member in electrical communication with the solar panel.

One or more windows can be disposed in the post member, with a light disposed within the post member, proximate the one or more windows. A reflective material can be coupled to an inside surface of the post member, proximate the one or more windows.

The foregoing and/or other aspects and advantages of the present general inventive concept may also be achieved by including at least one surround member coupled to and supported by the one or more static bars and one or more foot members to receive and support a refuse container.

The foregoing and/or other aspects and advantages of the present general inventive concept may also be achieved by including a fixed cover attached to the surround member and a gate member attached to the surround member in a manner allowing a refuse container to be moved horizontally into and out of the surround member. The surround member and gate member may include indicia or a portion configured to display indicia, such as a descriptive plate, name, symbol or similar label, welded, cast, molded or otherwise integrated into the gate member and one or more panels of the surround member.

Other features and aspects may be apparent from the following detailed description, the drawings, and the claims.

BRIEF DESCRIPTION OF THE SEVERAL VIEWS OF THE DRAWINGS

The above-mentioned features of the present general inventive concept will become more clearly understood from the following detailed description of the inventive concept read together with the drawings in which.

DETAILED DESCRIPTION OF THE INVENTIVE CONCEPT

Reference will now be made to various example embodiments of the present general inventive concept, examples of which are illustrated in the accompanying drawings and illustrations. The example embodiments are described herein in order to explain the present general inventive concept by referring to the figures.

Figure 3:
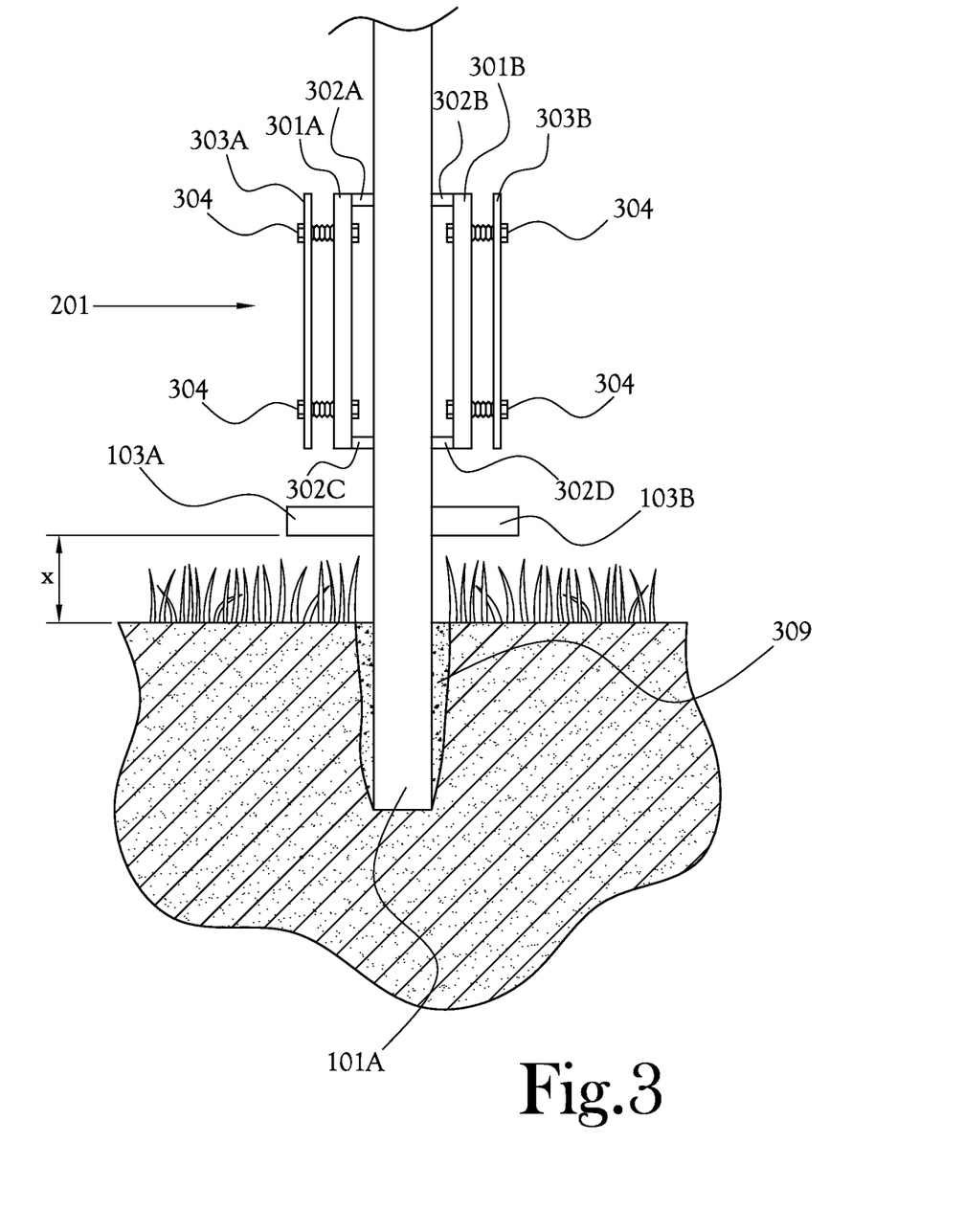
FIG. 3 is a more detailed illustration of a front view of the example embodiment of FIG. 2A with the first end of the post member disposed in the ground.

One example of a refuse container support apparatus 100, in accordance with various embodiments of the present general inventive concept is shown generally in FIGS. 1-9. Referring to FIGS. 1A & 1B, an elongated post member 101 is provided to support one or more refuse containers 102A & 102B. The elongated post member 101 in the illustrated embodiment includes a first end 101A and a second end 101B, and can be mounted in the ground so as to be substantially vertical. To that extent, the first end 101A can be inserted into a pre-sized hole in the ground. One of skill in the art will understand that filler material is typically used when disposing an object of this size vertically in the ground. Accordingly, in some embodiments, cement can be introduced into the pre-sized hole, around the inserted end 101A to provide additional support. FIG. 3 illustrates an example embodiment with the post member's first end 101A disposed in the ground and surrounded by cement 309. Other conventional filler materials can also be used without departing from the scope or spirit of the present general inventive concept.

Figure 1A:
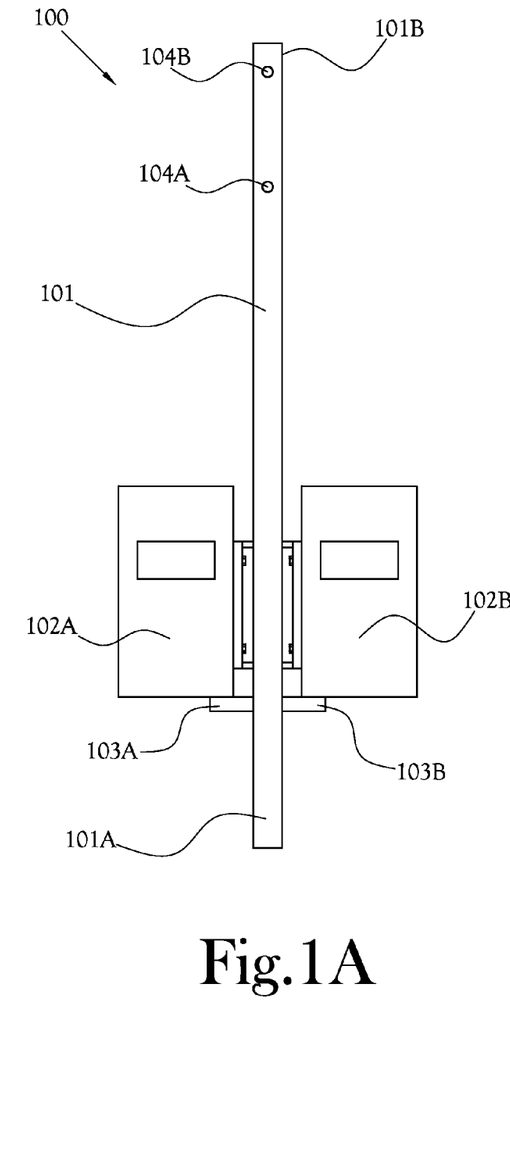
FIG. 1A illustrates a front view of an example embodiment of the present general inventive concept with two attached refuse containers.
Figure 1B:
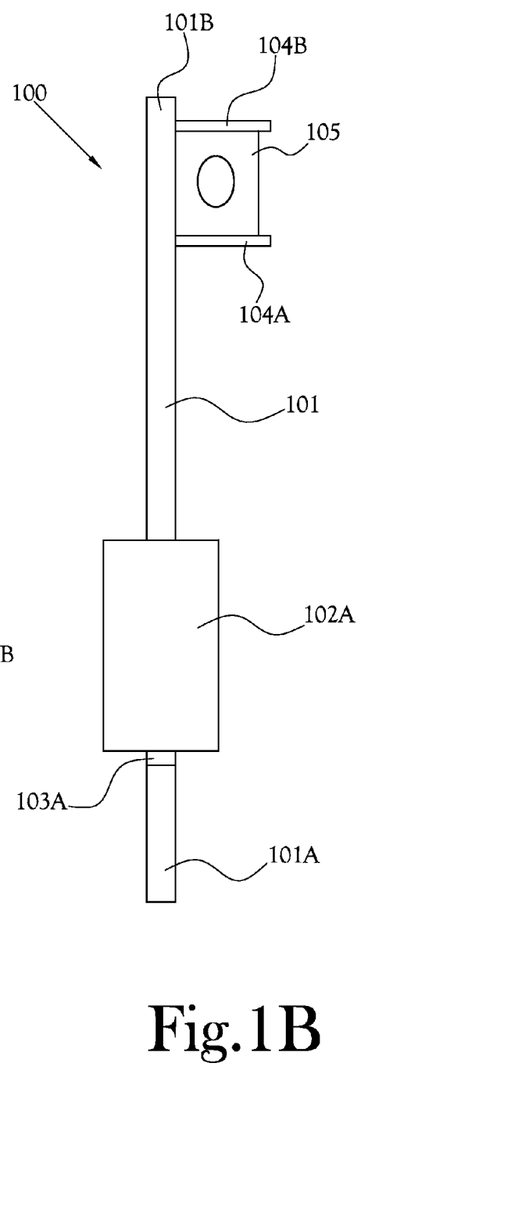
FIG. 1B illustrates a side view of the example embodiment of FIG. 1A.

Foot members 103A & 103B can be coupled to the post member 101 in a substantially perpendicular arrangement to at least partially support a refuse container in an elevated, substantially vertical position. In some embodiments, the foot members 103A & 103B are integrally formed with the post member 101. In other embodiments, the foot members 103A & 103B can be coupled to the post member 101 with conventional fasteners. In yet other embodiments, the foot members 103A & 103B can be welded to the post member 101.

The first end 101A of the post member 101 is preferably inserted into the ground to a point where the foot members 103A & 103B can be elevated to an extent so as to accommodate operation of a conventional grass trimmer underneath. FIG. 3 shows an example embodiment with the post member's first end 101A inserted into the ground, with x representing the distance between the ground and the foot members 103A & 103B. In some embodiments, the elongated post member 101 spans a length of fourteen (14) feet. In some embodiments, the first two (2) feet of the post member's first end 101A are inserted in the ground. In some embodiments, the foot members 103A & 103B are disposed approximately thirty (30) inches from the first end 101A and span a length of approximately nine (9) inches. Thus, in some embodiments, the foot members 103A & 103B are elevated approximately six (6) inches above the ground, so as to accommodate a conventional grass trimmer underneath. One of skill in the art will understand that the example dimensions discussed herein are non-limiting, and any of a number of other dimensions may be provided. Accordingly, different dimensions may be readily substituted for those which are disclosed herein without departing from the scope or spirit of the present general inventive concept.

Figure 2A:
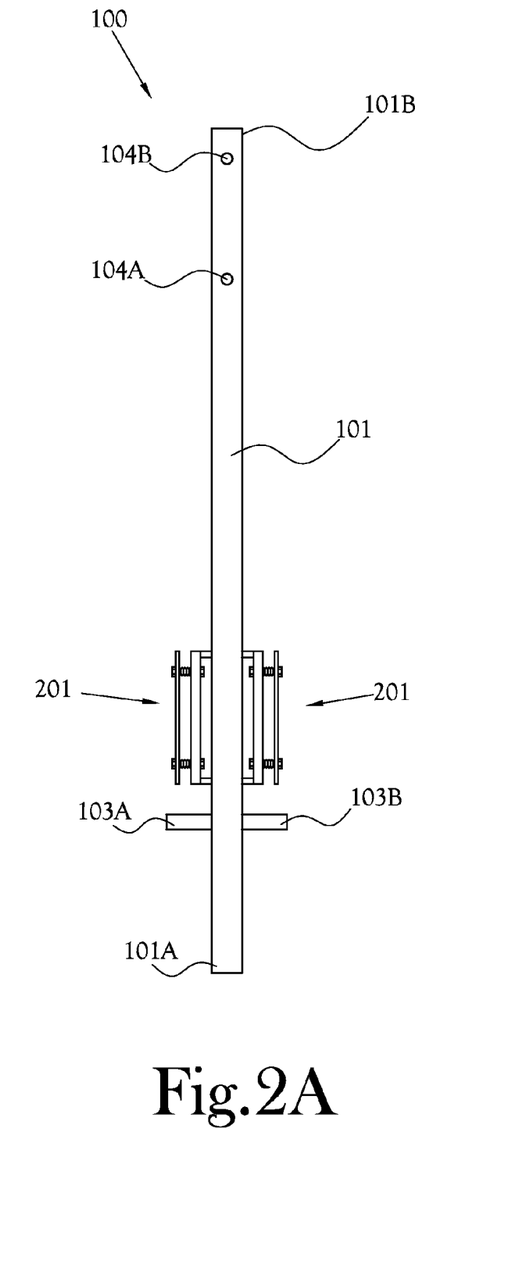
FIG. 2A illustrates a front view of the example embodiment of FIG. 1A, without the attached refuse containers.
Figure 2B:
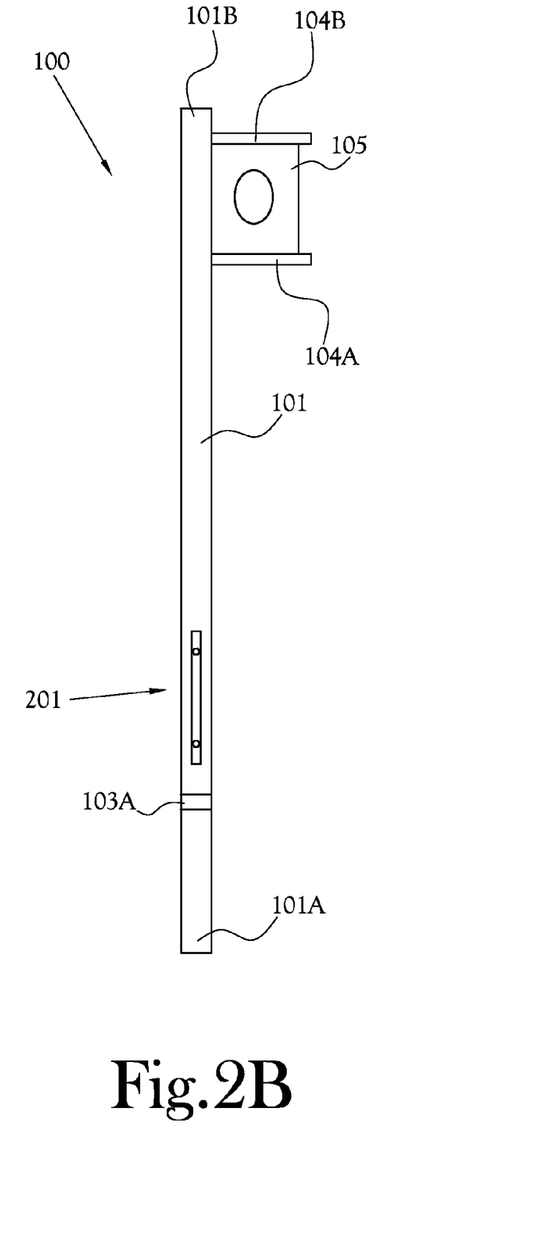
FIG. 2B illustrates a side view of the example embodiment of FIG. 2A.

Referring to FIGS. 2A-3, components 201 are provided to secure a refuse container 102 to the post member 101, proximate the foot members 103A & 103B, in accordance with various embodiments of the present general inventive concept. Static bars 301A & 301B can be coupled to and disposed substantially parallel to the post member 101. In some embodiments, the static bars 301A & 301B can be approximately two (2) feet in length. One skilled in the art will understand that this example dimension is non-limiting. In the illustrated embodiment, the static bars 301A & 301B are coupled to the post member 101 using welded spacers 302A-D. In other embodiments, the spacers 302A-D can be coupled to the post member 101 and static bars 301A & 301B using conventional fasteners. In other embodiments, the static bars 301A & 301B and spacers 302A-D can be integrally formed with the post member 101. In other embodiments (not illustrated), the static bars 301A & 301B can be disposed directly on the elongated post member 101. Stated differently, static bars 301A & 301B can be coupled directly to or integrally formed with the post member 101 without spacers.

The attachment bars 303A & 303B are removably coupled to the static bars 301A & 301B. In some embodiments, the attachment bars 303A & 303B can be substantially equal in length to the static bars 301A & 301B. In the illustrated embodiment, the attachment bars 303A & 303B are removably coupled to the static bars 303A & 303B by way of conventional fasteners 304.

In some embodiments (not illustrated), the attachment bars 303A & 303B can engage directly with the post member 101. Stated differently, the function served by the static bars 301A & 301B can be incorporated directly into the post member 100 such that the conventional fasteners 304 removably couple the attachment bars 303A & 303B directly to the post member 101.

The post member 101 can be any type of conventional material, but should be strong enough to support a filled refuse container, and durable enough to withstand nature's elements. One such material that has been used with success is, for example, steel. Likewise, in some embodiments, the foot members 103A & 103B, static bars 301A & 301B, spacers 302A-D, and attachment bars 303A & 303B are all substantially comprised of steel. One skilled in the art will recognize that the particular material used for each of the above-mentioned components is non-limiting, and may be substituted for without departing from the scope or spirit of the present general inventive concept.

Referring now to FIGS. 1A-3, the refuse containers 102A & 102B can be removably coupled to the post member 101 using the components illustrated at 201. Specifically, the refuse containers 102A & 102B can be disposed on top of, and at least partially supported by, the foot members 103A & 103B. Attachment bars 303A & 303B can be removably coupled to the static bars 301A & 301B from within the interior of the refuse containers 102A & 102B, thereby securing the refuse containers 102A & 102B to the static bars 301A & 301B and, ultimately, the post member 101. Stated differently, the attachment bars 303A & 303B can be coupled to the static bars 301A & 301B from within the interior of the refuse containers 102A & 102B by virtue of conventional fasteners 304 penetrating the refuse containers 102A & 102B. Importantly, the present general inventive concept is not confined to the use of two refuse containers 102A & 102B and means for supporting such. In other embodiments, the present general inventive concept can be comprised of only one set of refuse container support components 201.

In FIGS. 1A-2B, two sign retaining members 104A & 104B are included, proximate the second end 101B of the post member 101. Each sign retaining member 104A & 104B in the illustrated embodiments is an elongated pole or rod. An accompanying sign 105 can be coupled to both sign retaining members 104A & 104B such that the sign 105 is fully displayed. Stated differently, the sign 105 in the illustrated embodiments is coupled to the sign retaining members at all four corners of the sign 105. In some embodiments, only one sign retaining member 104B can be used. In some embodiments, the lower sign retaining member 104A can be above eye level, so as to prevent injury and accommodate viewing of the sign 105 from a substantial distance away from the post member 101. In some embodiments, the lower sign retaining member 104A can be disposed at a height such that it cannot be grabbed by the average individual. In some embodiments, the lower sign retaining member 104A can be elevated approximately nine and one-half (9½) feet above the ground.

Figure 4A:
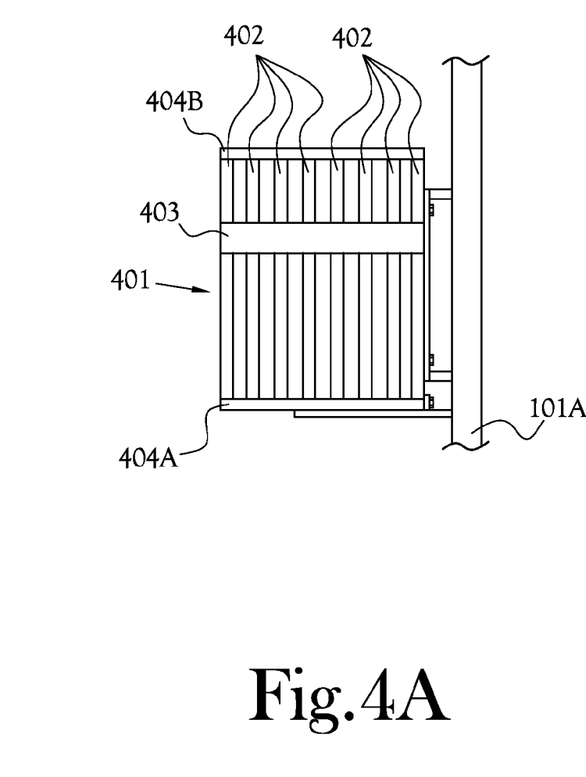
FIG. 4A illustrates front view of another example embodiment of the present general inventive concept with one attached surround member.
Figure 4B:
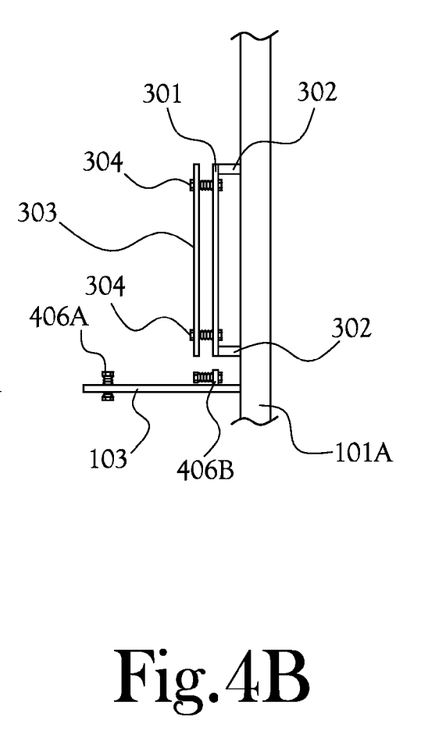
FIG. 4B is a more detailed illustration of a front view of an example embodiment capable of accommodating a surround member, but without the surround member attached.
Figure 4C:
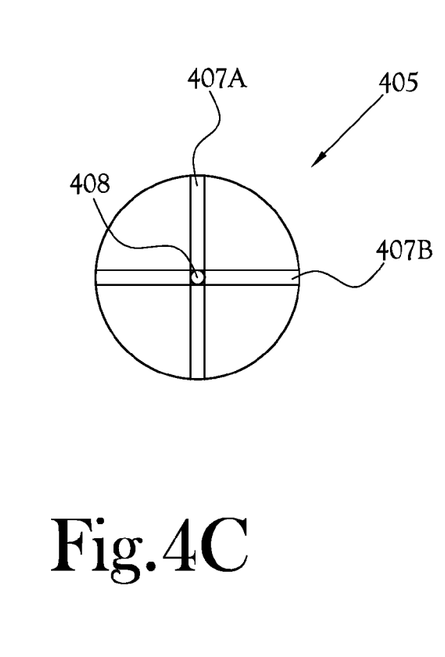
FIG. 4C illustrates a bottom view of an example embodiment surround member in accordance with various embodiments of the present general inventive concept.

Referring now to FIGS. 4A-4C, in some embodiments of the present general inventive concept, a surround member 401 can be coupled to the post member 101, for receiving and supporting a refuse container. In the illustrated embodiment, the surround member 401 is comprised of several annularly spaced vertical panels 402 disposed on a substantially circular base portion 405. A circumferential middle panel 403, top panel 404B, and bottom panel 404A are also included in the illustrated embodiment. In some embodiments, the surround member 401 can be generally comprised of steel. One of skill in the art will recognize that the composition of the surround member 401 is not critical to the present general inventive concept. Accordingly, materials other than steel can be readily substituted without departing from the scope or spirit of the present general inventive concept.

In some embodiments, the surround member's circular base 405 can have a diameter of approximately twenty-seven and one-fourth (27¼) inches. In some embodiments, the surround member's vertical panels 402 can be thirty-five (35) inches tall and one and one-half (1½) inches wide. In the illustrated embodiment, vertical panels 402 are selectively positioned to allow for open intervals between each of the vertical panels 402. One of skill in the art will understand that the above-mentioned example dimensions are meant to be non-limiting, and may be substituted for without departing from the scope or spirit of the present general inventive concept.

In some embodiments, the surround member 401 can be coupled to the post member 101 using a foot member 103, a static bar 301, and conventional fasteners 304. FIG. 4A portrays a surround member 401 partially supported by the foot member 103 and secured against the static bar 301 with conventional fasteners 304 penetrating one of the annularly spaced vertical panels 402. In the illustrated embodiment, spacers 302 are used to couple the static bar 301 to the post member 101. Contrastingly, FIG. 4B illustrates another embodiment, wherein an attachment bar 303 can be coupled to the static bar 301 with two conventional fasteners 304 disposed in an open interval between two vertical panels 402, one above the circumferential middle panel 403 and one below it, thereby securing the surround member 401 to the post member 101. In the embodiments illustrated in FIGS. 4A & 4B, foot member fasteners 406A & 406B are also used to secure the surround member 401 to the foot member 103. Foot member 103, in the present embodiment, is designed to support the surround member 401 by receiving one of the cross members 407A, 407B of the surround member's circular base portion 405 on top of it, in a substantially aligned manner. In this embodiment, the foot member 103 spans a length of approximately twenty-one (21) inches, so as to provide a point of attachment for the substantial center of the surround member's circular base portion 405. Further, in the embodiment illustrated in FIG. 4B, the vertically disposed foot member fastener 406A penetrates both cross members 407A, 407B at their intersection, illustrated at 408, while the horizontal foot member fastener 406B penetrates the bottom circumferential panel 404A.

Figure 5:
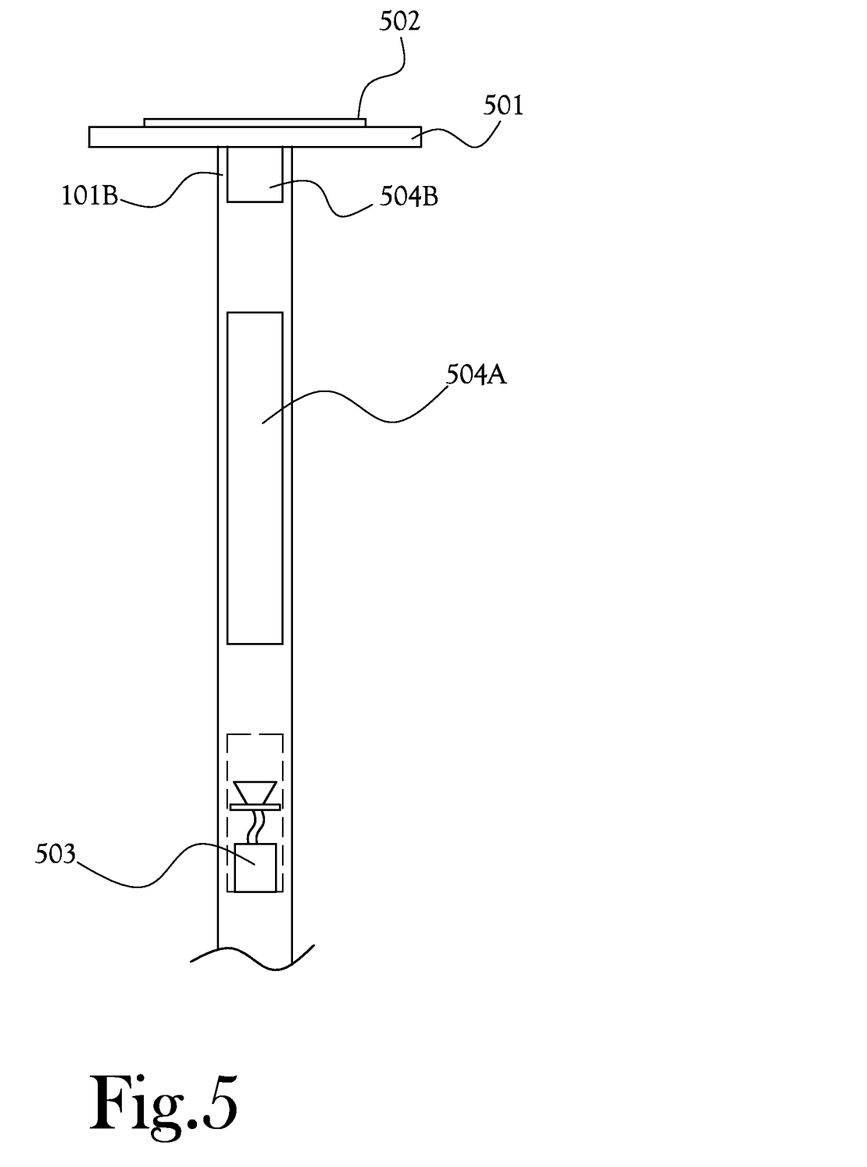
FIG. 5 is a more detailed illustration of an example embodiment of the present general inventive concept, showing a top member, a solar panel, a light, and windows.

In some embodiments, the second or top end 101B of the post member 101 can include a substantially flat top member, disposed substantially perpendicular to the substantially vertical post member 101. Referring to FIG. 5, a top member 501 is perpendicularly coupled to the post member 101 by way of conventional fastening techniques, such as, for example, conventional fasteners, welding or the like. In other embodiments, the top member 501 is integrally formed with the post member 101. The top member 501 is designed for receiving and securing a solar panel 502 on the top member's surface distal the post member 101. Stated differently, a solar panel 502 sits atop top member 501 to receive solar emissions from the sun. In the illustrated embodiment, a light 503 is also included and coupled to the post member 101, proximate the second end 101B. The light 503 is in electrical communication with the solar panel 502, such that the solar panel 502 provides power to the light 503.

In some embodiments, the light 503 is actuated in response to the solar panel 502 not receiving solar emissions. Stated differently, the light 503 remains off during the day while sunlight is prevalent, and is turned on in the evening when it becomes dark and the solar panel 502 is no longer receiving sunlight.

A light can be included on the present general inventive concept to illuminate the area immediately adjacent to the post member 101, and to illuminate the sign 105 such that it can be viewed at night from a substantial distance away from the post member 101. In the illustrated embodiment, the light 503 is disposed within the post member 101. In this embodiment, an access door (not illustrated) is provided in the post member 101, proximate the light 503, such that the light 503 can be accessed for maintenance, replacement, or both. In the illustrated embodiment, a halogen light bulb is used. In other embodiments, an LED light is used. One of skill in the art will understand that various types of light bulbs can be utilized without departing from the scope or spirit of the present general inventive concept, so long as the selected solar panel is capable of providing a sufficient amount of power to actuate the selected light bulb. Further, the illustrated embodiment also includes windows 504A & 504B to permit the light 503 to illuminate the immediately adjacent area. The precise number and position of the windows 504A & 504B may be selected according to the particular illuminating needs of the location of the refuse container support apparatus 100. In some embodiments, the interior surface of the post member 101, proximate the windows 504A & 504B can be covered with a reflective material (not illustrated) to increase the illuminating effect provided by the light 503. In these embodiments, reflective paint and tape have both been used with success. However, one skilled in the art will recognize that other reflective materials capable of being coupled to a substantially smooth surface may also be utilized without departing from the scope or spirit of the present general inventive concept.

Figure 6:
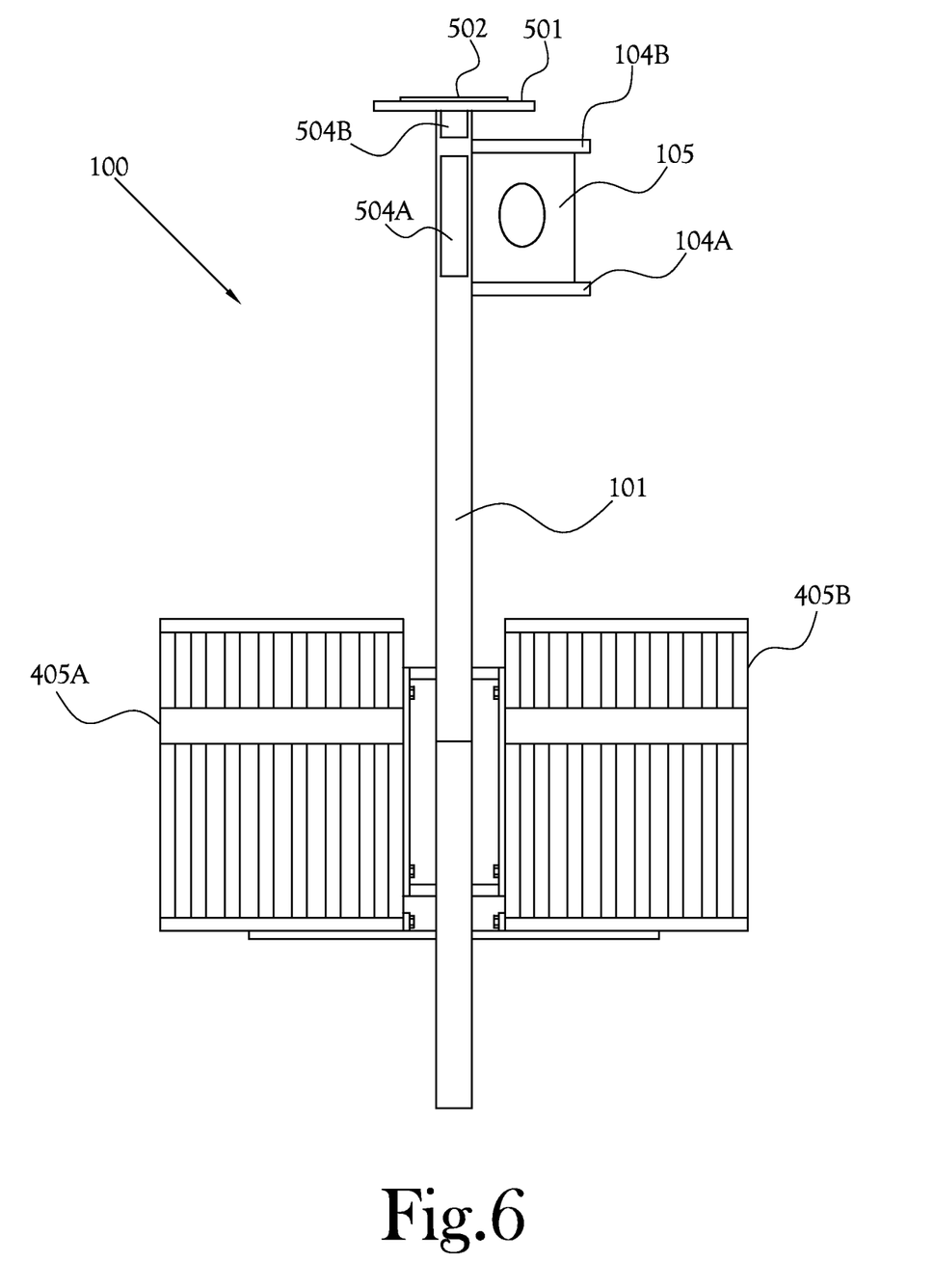
FIG. 6 illustrates a front view of an example embodiment of the present general inventive concept with two surround members, a top member, a solar panel, a light, and windows.

FIG. 6 illustrates a front view of an example embodiment of the present general inventive concept. The presently illustrated embodiment includes two surround members 405A, 405B; two sign retaining members 104A, 104B; a sign 105; two windows 504A, 504B proximate a light disposed inside the post member 101; a top member 501; and a solar panel 502 in electrical communication with the light. The present embodiment accommodates two refuse containers that may be received in and secured by the surround members 405A & 405B. To that extent, both a garbage container and a recycling container can be provided.

Figure 7:
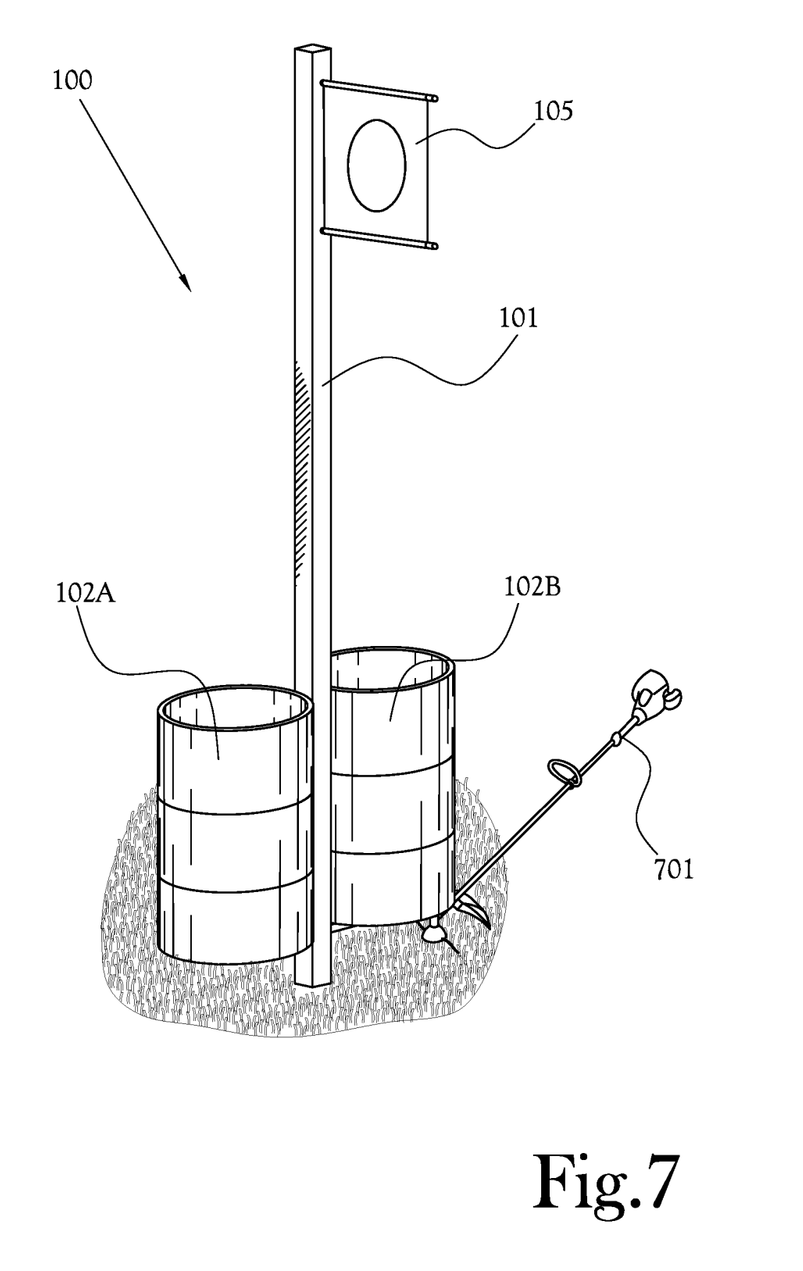
FIG. 7 illustrates a perspective view of an example embodiment of the present general inventive concept with a conventional grass trimmer operating beneath a secured refuse container.

FIG. 7 illustrates a perspective view of an example embodiment of the present general inventive concept with a conventional grass trimmer 701 operating underneath an elevated, secured refuse container 102B. In the illustrated embodiment, two refuse containers 102A & 102B are both supported by the refuse container support apparatus 100 in an elevated manner. Referring also to FIG. 3, the distance x between the ground and the foot members 103A & 103B is also the distance of elevation for the secured refuse containers 102A & 102B in FIG. 7. Thus, in some embodiments of the general present inventive concept, the refuse container support apparatus 100 can accommodate two refuse containers 102A & 102B while also permitting the operation of a conventional grass trimmer 801 underneath.

Figure 8:
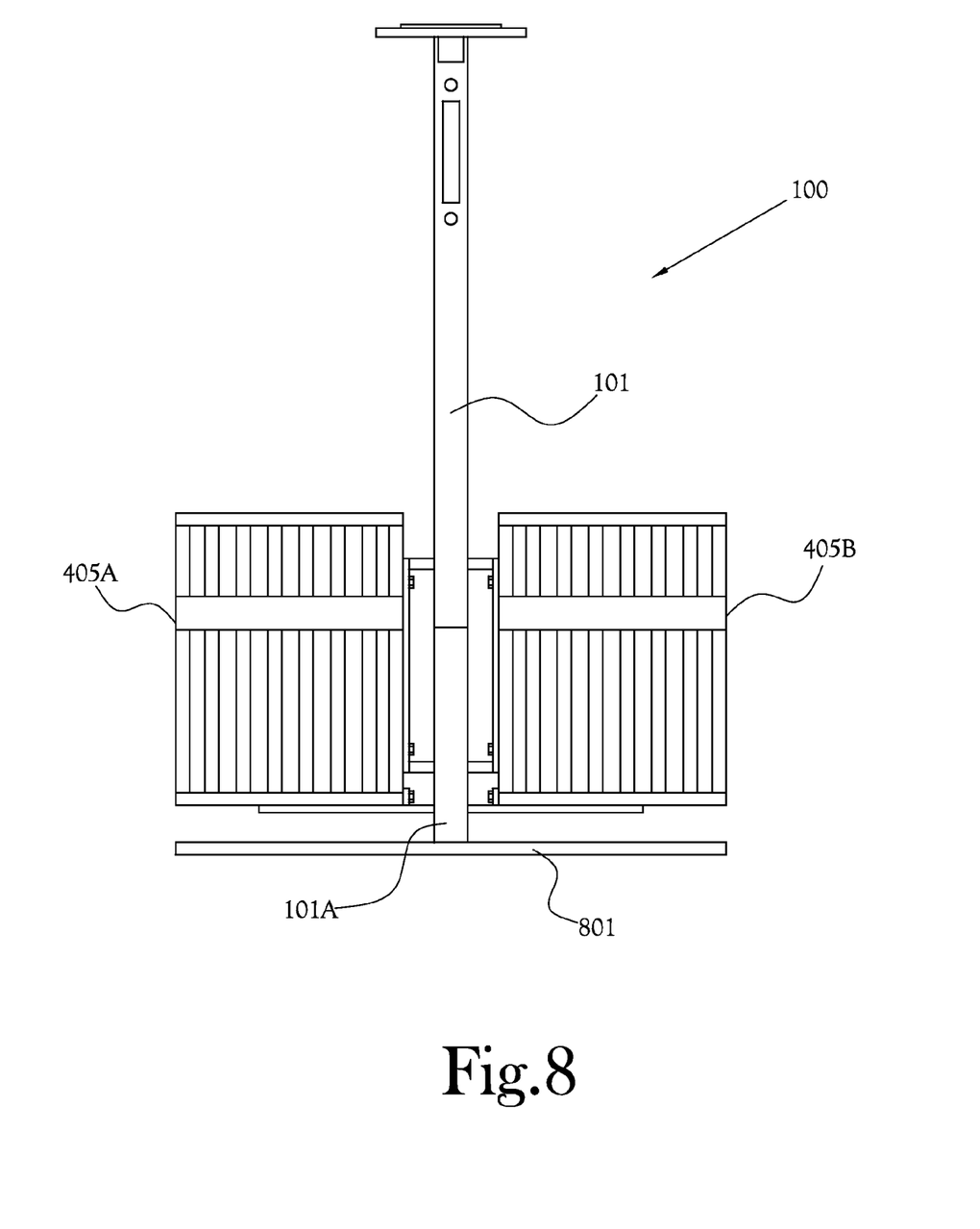
FIG. 8 illustrates a front view of an example embodiment of the present general inventive concept with a portable base unit.

In some embodiments of the present general inventive concept, a substantially flat base member can be substantially, perpendicularly coupled to the first end 101A of the post member 101. Referring to FIG. 8, base member 801 is perpendicularly coupled to the post member 101 to provide an alternative means to vertically support the post member 101. The base member 801 can be perpendicularly coupled to the post member 101 by conventional fastening techniques, or it can be integrally formed with the post member 101. This embodiment provides a portable option to the present general inventive concept that can be used, for example, at fairs or other temporary outdoor events where permanent installation of the refuse container support apparatus 100 is not desirable. In some embodiments, one or more wheels can be coupled to the outer perimeter rim of the base member 801 such that the refuse container support apparatus 100 can be tilted and rolled across a substantially flat surface.

In some embodiments, the base member 801 can be substantially comprised of steel. In some embodiments, a one-half (½) inch steel plate is used as the base member 801. The surface area of base member 801 can vary according to the height and weight of the post member 101. For instance, one skilled in the art will understand that the tipping force required for overturning the refuse container support apparatus 100 depends on the dimensions of the base member 801, in combination with the overall weight of the apparatus 100 and the height of the tipping force being applied. In some embodiments, the base member 801 is sixty-three and one-half (63½) inches long, by twenty-eight (28) inches wide. Those skilled in the art will understand that these example dimensions are meant to be non-limiting. For example only, if the refuse container support apparatus 100 weights approximately fifteen hundred fifty (1550) pounds, the above mentioned example dimensions would provide a stabilizing presence to the extent that greater than six hundred (600) pounds of tipping force, applied at a height of approximately six (6) feet along the width axis of the base member 801, would be necessary to overturn the apparatus 100.

Figure 9:
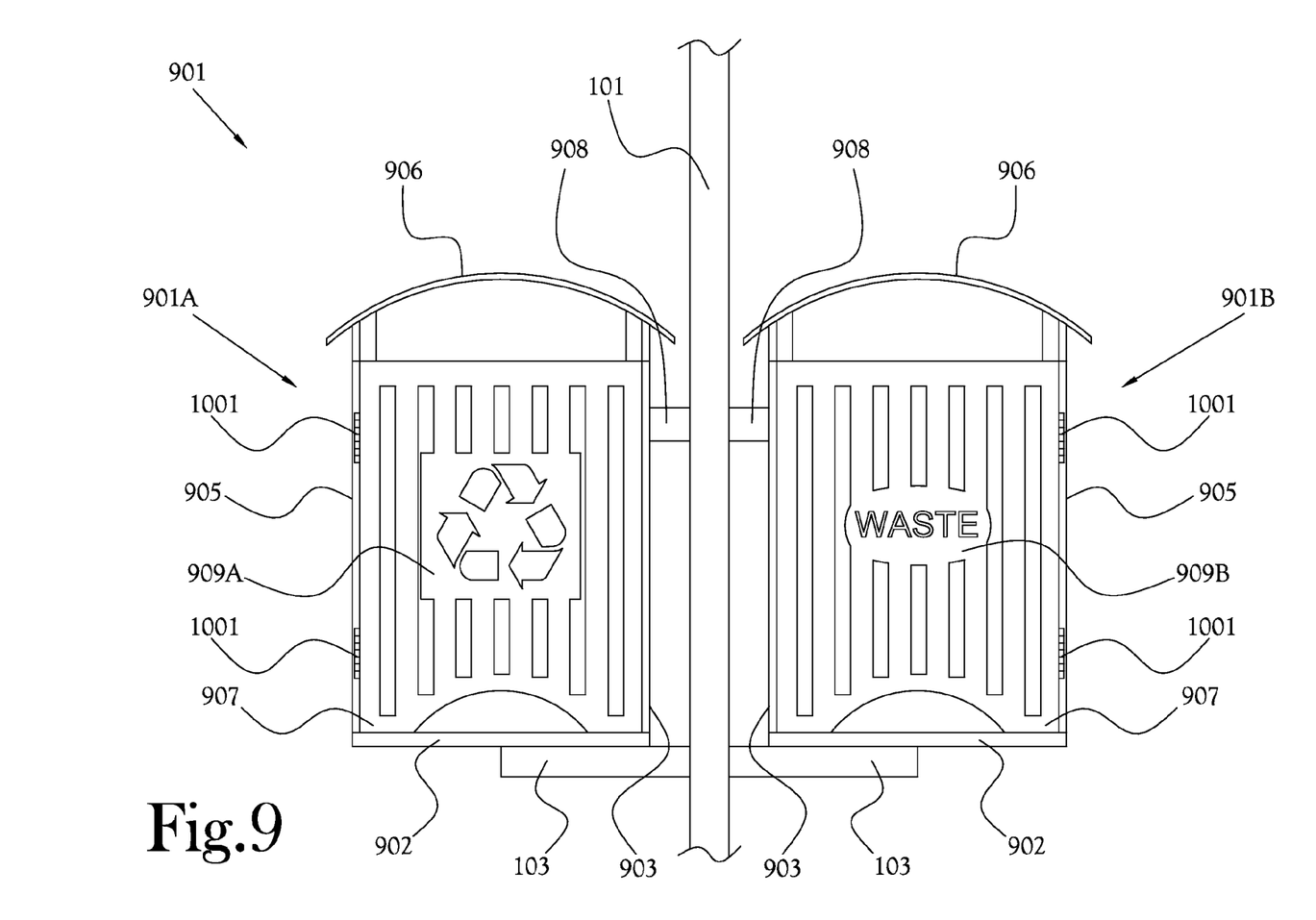
FIG. 9 illustrates a front view of an example embodiment of the present general inventive concept having two square surround members with fixed covers and hinged gate members.
Figure 10:
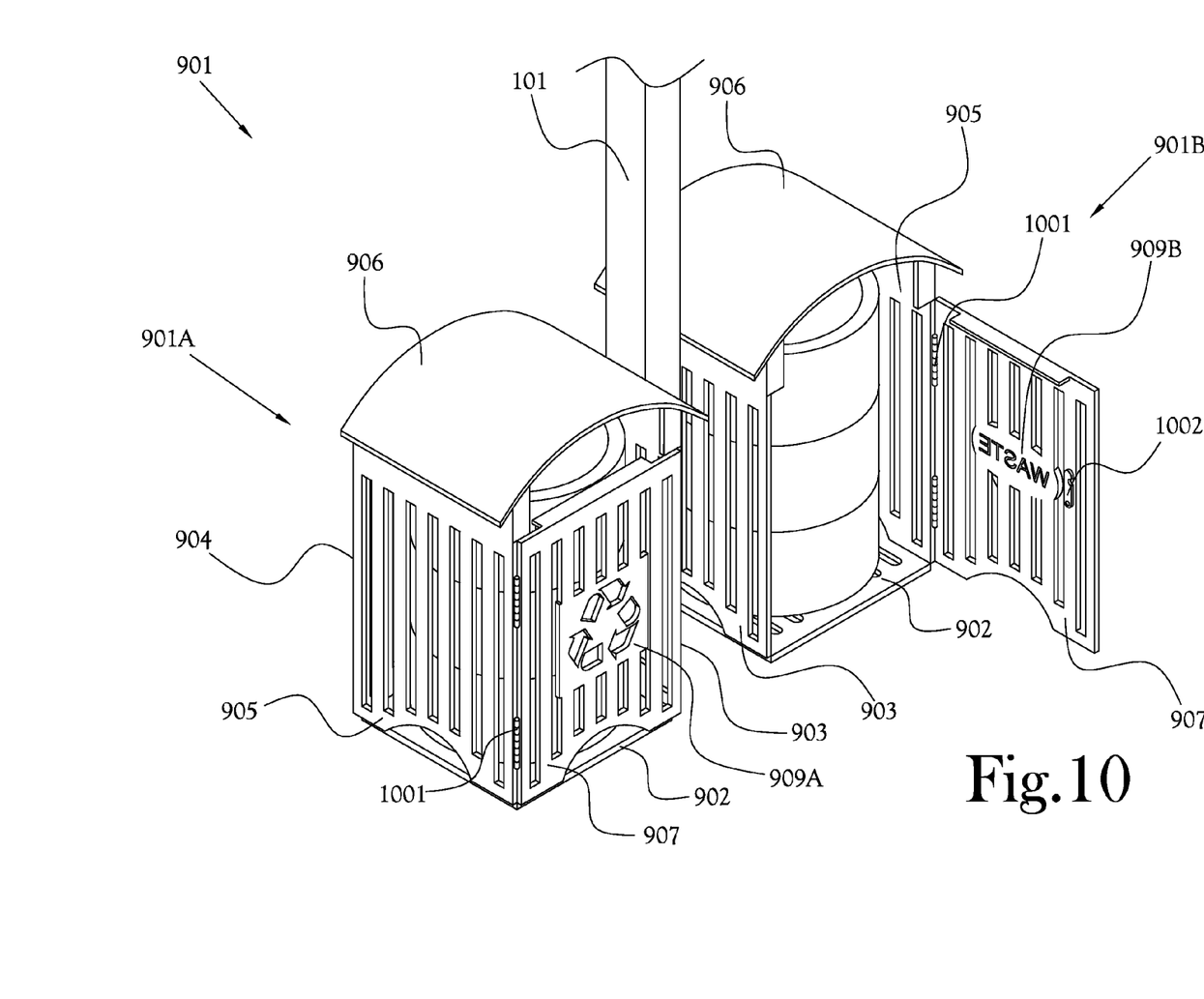
FIG. 10 illustrates a three-dimensional view of the example embodiment of FIG. 9.

Referring now to FIGS. 9 & 10, in various example embodiments of the present general inventive concept, two surround members 901A & 901B may be coupled to the post member 101, each said surround member configured to receive and support a refuse container 102. In the example embodiment illustrated in FIGS. 9 & 10, each surround member 901 is may include a base 902, an inside panel 903, a back panel 904, an outside panel 905, and a fixed cover 906, all coupled to each other to form each surround member 901, and a gate member 907, said gate member configured to swing or slide open allowing a refuse container 102 to be inserted into and removed from the surround member 901A, 901B in a horizontal direction instead of a vertical direction. In the example embodiment illustrated in FIGS. 9 & 10, the fixed cover 906 may be an upward curving sheet of rolled steel forming a fixed cover over the interior volume of the surround member 901 as well as the enclosed refuse container 102, and forming two or more opposing openings below the fixed cover 906 and above the vertical panels of the surround member 901 and the gate member 907 sufficient to permit refuse to be dropped into the refuse container 102. In the illustrated embodiment, there are two openings below the fixed cover 906 of the surround member 901— one above the back panel 904 and the other above the gate member 907. In the illustrated embodiment, the base 902, the inside panel 903, the back panel 904, the outside panel 905, and the fixed cover 906 are cut from sheet steel and welded together to form each surround member 901. In the illustrated embodiment, the gate member 907 may be cut from sheet steel with the top edge folded at a substantially 90 degree angle to form a horizontal edge extending inwardly into the surround member 901A, 901B when the gate member 901 is closed. One skilled in the art will recognize that the previously described material used for the surround member 901 and the gate member 907 is non-limiting, and various other materials such as, for example, plastic, aluminum, fiberglass, and other suitable materials, or various combinations thereof, may be substituted for steel without departing from the scope or spirit of the present general inventive concept. In other embodiments of the present inventive concept, the base 902, the inside panel 903, the back panel 904, the outside panel 905, and the fixed cover 906 may be cast, molded or poured together to form the surround member 901 as one part. In various other example embodiments, said panels 903, 904, 905 and said gate member 907 may be comprised of parallel vertical steel bars spaced and welded to a top and bottom steel bar to form said panels and said gate member, and then welded to said base and said fixed top to form the surround member 901 as one part. In various other example embodiments, said base, said panels and said fixed cover may be attached together by means of conventional fastening techniques, such as, for example, bolts, other conventional fasteners, or the like, to form the surround member.

In the example embodiments illustrated in FIGS. 9 & 10, each inside panel 903, back panel 904, outside panel 905, and gate member 907 may be cut from a steel sheet with a bottom edge curving upward after extending horizontally a short distance from each vertical edge, straight vertical side edges, and a straight horizontal top edge, with equally spaced parallel vertical slots cut out for ventilation to form each panel or gate member. The base 902 of the surround member 901 may be cut from a square metal sheet, with equally spaced parallel slots cut out for ventilation and for drainage and with holes drilled for attachment of the surround member 901 to the foot member 103. In the illustrated embodiments, foot member fasteners 406A & 406B are used to secure the surround members 901A & 901B to the foot member 103. In the illustrated embodiments, horizontal spacer bars 908 may be welded to the post member 101 on one end and to the inside panel of the surround member 901 on the other end. In other embodiments of the present inventive concept, the surround member 901 may be attached to the post member 101 by means of any of a number of conventional fastening techniques, such as, for example, bolts, other conventional fasteners, or the like, with or without spacers. One skilled in the art will recognize that the described material used for the surround member 901 and the gate member 907 is non-limiting, and various other materials such as, for example, plastic, aluminum, fiberglass and other suitable materials may be substituted for steel without departing from the scope or spirit of the present general inventive concept.

In some embodiments of the present general inventive concept, indicia or a portion configured to display indicia such as, for example, a descriptive plate, name, symbol or similar label may be welded, cast, molded or otherwise integrated into the gate member 907 and one or more panels of the surround member 901 to identify the type of refuse container 102 located inside said surround member. Referring to the embodiment illustrated in FIGS. 9 & 10, labels 909A & 909B identifying the type of refuse container 102 located inside surround members 901A and 901B are cut and integrated into the center of the gate member 907 and the center of the back panel 904 of each surround member 901.

In the embodiment illustrated in FIG. 10, the gate member 907 is attached to the outside panel 905 of the surround member 901 by two conventional hinges 1001, and the other side of the gate member 907 may be latched to the inside panel 903 of the surround member 901 by means of a latch fastener 1002. In other example embodiments of the present inventive concept, the gate member 907 could be latched to the base 902 of the surround member 901 by means of a conventional latch, or the like, and the size, number and placement of the hinges and the latch could depart from the illustrated hinges and latch. The hinged gate member 907 allows the refuse container 102 to slide horizontally into and out of the surround member 901, such that sanitary personnel do not have to remove a cover from the surround member and then lift said refuse container vertically out of the enclosure to empty the contents of said refuse container.

While the present general inventive concept has been illustrated by description of several embodiments and while the illustrative embodiments have been described in detail, it is not the intention of the applicant to restrict or in any way limit the scope of the appended claims to such detail. Additional modifications will readily appear to those skilled in the art. The general inventive concept in its broader aspects is therefore not limited to the specific materials, dimensions, details, fasteners, representative apparatus and methods, and illustrative examples shown and described. Accordingly, departures may be made from such details without departing from the spirit or scope of applicant's general inventive concept.

The invention claimed is:

1. An apparatus to support a refuse container having an interior volume, said apparatus comprising:
   an elongated post member including a first end and a second end, said first end disposed to support said second end above the ground;
   at least one foot member coupled to said post member between said first and second ends to at least partially support a weight of a refuse container above the ground; and
   at least one attachment bar to removably couple said refuse container to said post member from within said interior of said refuse container, the at least one attachment bar being configured as an elongated member to be disposed within said interior of said refuse container and coupled to a supporting member at a plurality of points of the attachment bar.

2. The apparatus of claim 1, wherein said first end of said post member is to be inserted into the ground to support said post member in a substantially vertical manner, said at least one foot member disposed at a selected distance from said first end such that said at least one foot member remains elevated above the ground when said first end is disposed in the ground.

3. The apparatus of claim 1, further comprising:
   a plurality of fasteners to penetrate a refuse container and removably couple said at least one attachment bar and said refuse container to said post member.

4. The apparatus of claim 3, further comprising:
   at least one static bar coupled to said post member between said at least one foot member and said post member's second end;
   whereby said at least one attachment bar is removably coupled to said at least one static bar by said plurality of fasteners.

5. The apparatus of claim 4, further comprising:
   at least one spacer coupling said at least one static bar to said post member.

6. The apparatus of claim 1, further comprising:
   at least one sign retaining member coupled to said post member to receive and display a sign.

7. The apparatus of claim 1, further comprising:
a substantially flat base member coupled to said post member's first end such that said base member supports said post member in a substantially vertical manner.

8. The apparatus of claim 7, further comprising:
at least one wheel coupled to a perimeter edge of said base member.

9. The apparatus of claim 7, wherein said post member is at least six feet long, said apparatus requiring at least six hundred pounds of force applied to said post member at a height of six feet to overturn said apparatus.

10. The apparatus of claim 1, further comprising:
a substantially flat top member coupled to said second end of said post member such that said top member is substantially parallel to the ground;
a solar panel coupled to said top member; and
a light coupled to said post member in electrical communication with said solar panel.

11. The apparatus of claim 10, further comprising:
at least one window disposed in said post member; and
reflective material coupled to an inside surface of said post member, proximate said window;
wherein said light is disposed within said post member, proximate said at least one window.

12. An apparatus to support a refuse container having an interior volume, said apparatus comprising:
an elongated post member including a first end and a second end, said first end disposed to support said second end above the ground;
at least one foot member coupled to said post member between said post member's first and second ends;
at least one static bar coupled to said post member by at least one spacer, said at least one static bar disposed between said at least one foot member and said post member's second end;
at least one surround member removably coupled to and supported by said at least one static bar and said at least one foot member, said surround member to receive and support a refuse container;
a substantially flat top member coupled to said second end of said post member such that said top member is substantially parallel to the ground;
a solar panel coupled to said top member; and
a light coupled to said post member in electrical communication with said solar panel.

13. The apparatus of claim 12, wherein said first end of said post member is to be inserted into the ground to support said post member in a substantially vertical manner, said at least one foot member disposed at a selected distance from said first end such that said at least one foot member remains elevated above the ground when said first end is disposed in the ground.

14. The apparatus of claim 12, further comprising:
at least one sign retaining member coupled to said post member to receive and display a sign.

15. The apparatus of claim 12, wherein said at least one surround member is comprised of a plurality of annularly spaced vertical panels coupled to a substantially circular base portion.

16. The apparatus of claim 12, further comprising:
a substantially flat base member coupled to said post member's first end such that said base member supports said post member in a substantially vertical manner.

17. The apparatus of claim 16, further comprising:
at least one wheel coupled to a perimeter edge of said base member.

18. The apparatus of claim 16, wherein said post member is at least six feet long, said apparatus requiring at least six hundred pounds of force applied to said post member at a height of six feet to overturn said apparatus.

19. The apparatus of claim 12, further comprising:
at least one window disposed in said post member; and
reflective material coupled to an inside surface of said post member, proximate said window;
wherein said light is disposed within said post member, proximate said at least one window.

20. An apparatus to support a refuse container having an interior volume, said apparatus comprising:
an elongated post member including a first end and a second end, said first end disposed to support said second end above the ground;
at least one foot member coupled to said post member between said post member's first and second ends;
at least one spacer coupled to said post member, said at least one spacer disposed between said at least one foot member and said post member's second end;
at least one surround member coupled to and supported by said at least one spacer and said at least one foot member, said surround member to horizontally receive and support a refuse container;
a fixed cover to the surround member with two opposing openings below the fixed cover, said fixed cover configured to permit refuse to be dropped into the refuse container; and
a gate member attached to the surround member configured to allow insertion and removal of a refuse container.

21. The apparatus of claim 20, wherein said first end of said post member is to be inserted into the ground to support said post member in a substantially vertical manner, said at least one foot member disposed at a selected distance from said first end such that said at least one foot member remains elevated above the ground when said first end is disposed in the ground.

22. The apparatus of claim 20, further comprising at least one sign retaining member coupled to said post member to receive and display a sign.

23. The apparatus of claim 20, wherein said at least one surround member is comprised of an inside panel, an outside panel and a back panel coupled to a square base panel at the bottom of said surround member, with said panels also coupled to said fixed cover at the top of said surround member.

24. The apparatus of claim 23, wherein said fixed cover of said surround member is an upward curving cover above the surround member and configured with two openings below said cover, one opening above the back panel of the surround member and the other opening above the gate member, said fixed cover configured to protect the refuse container and its contents from the elements, and said openings configured to permit refuse to be dropped into the refuse container.

25. The apparatus of claim 20, wherein said gate member is attached by hinges to the surround member, said gate member being configured to allow the refuse container and its contents to slide horizontally into and out said surround member.

26. The apparatus of claim 20, further comprising indicia or a portion configured to display indicia welded, cast, or molded into the gate member and one or more panels of the surround member, the displayed indicia being at least one of a descriptive plate, name, or symbol.

27. The apparatus of claim 20, further comprising:
a substantially flat top member coupled to said second end of said post member such that said top member is substantially parallel to the ground;
a solar panel coupled to said top member; and
a light coupled to said post member in electrical communication with said solar panel.

28. The apparatus of claim 27, further comprising:
at least one window disposed in said post member; and
reflective material coupled to an inside surface of said post member, proximate said window;
wherein said light is disposed within said post member, proximate said at least one window.

\* \* \* \* \*